Feb. 1, 1955     S. W. CRAWFORD     2,700,871
SURGE RELIEF SYSTEM FOR ROCKET MOTOR FUEL SUPPLY SYSTEM
Filed June 22, 1948
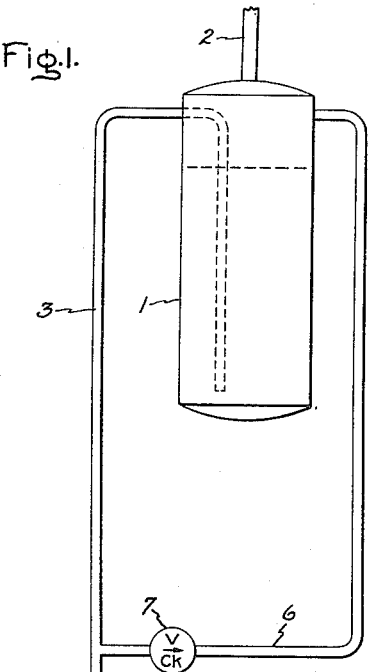
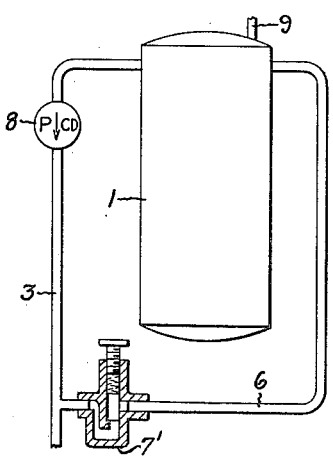
Inventor:
Samuel W. Crawford,
by Harry R. Mayers
His Attorney.

United States Patent Office 2,700,871
Patented Feb. 1, 1955

2,700,871

SURGE RELIEF SYSTEM FOR ROCKET MOTOR FUEL SUPPLY SYSTEM

Samuel W. Crawford, Schenectady, N. Y., assignor to General Electric Company, a corporation of New York Application June 22, 1948, Serial No. 34,398

1 Claim. (Cl. 60—39.1)

This invention relates to a fuel supply system and more particularly to a surge system for the fuel supply of a rocket motor.

In general, there are two types of rockets. The first type utilizes all the fuel that it carries to attain a certain range. The second uses only a part of the total fuel that it carries and a shut-off of the fuel supply occurs at some point in the trajectory of the rocket missile. The point at which the shut-off of the fuel occurs is known as the predetermined cut-off point. The shut-off of fuel is accomplished by the use of a valve such as a solenoid type or hydraulic fluid type quick-operating valve. Due to the very short period of time consumed between the full-open and full-closed position of the solenoid valve, surge of the fuel occurs in the fuel line. The mechanics and nature of surge will now be described. When liquids are flowing in pipes or tubes, the liquid within the pipe or tube has a certain inertia force due to the velocity and mass of the flowing fuel column. If a valve in the fuel line slowly chokes off the flow of fluid the velocity of the entire column of fluid is gradually reduced and the inertia force is slowly dissipated throughout the system. If on the other hand, the interval of time between full-open and full-closed of the valve in the line is very short, there is no opportunity for the inertia force to be absorbed by the system and the resultant forces developed are great in magnitude. In fact, theoretically, if there is no friction in the line, and if the interval of time between full-open and full-close of a valve is negligible, the forces built up by surge in the system approach an infinite value. Furthermore, since this great force cannot be absorbed and if none of the structural parts of the system give way physically, a rapid reversal of forces occurs resulting in a resonant phenomenon which is similar to water hammer.

Results of surge in a rocket fuel line would be the bursting of the fuel line if a sufficiently high surge pressure is created by the sudden closure of the solenoid valve when the rocket motor is shut off. This would result in a leakage of fuel within the rocket and the resultant obvious possibility of fire. Still further the point of predetermined cut-off may only be a temporary cessation of fuel feed and at some later time a resumption of fuel flow may be desired. If this were the case, a rupture of the fuel line would be disastrous wth respect to further fuel flow.

These same problems are present in the static testing of rockets on test stands. Inasmuch as rocket motor and rocket fuel developments are important research projects extending over substantial periods of time and involving large research facilities and expenditures, the necessity of an efficient and economic surge system as part of the testing apparatus is apparent.

In the past a method of eliminating the detrimental effects of surge consisting of supplying a surge tank somewhere in the fuel line, which surge tank, being not completely filled with fuel, would eliminate the possible large surge forces by receiving the fuel from the fuel line and storing within the unfilled portion of the surge tank. This tank is usually quite large, occupies much space, and increases the weight of the entire system by reason of the material making up said tank.

Another manner of meeting the problem is to provide extra strong fluid pipes with safety factors many times greater than that required to withstand ordinary flow pressures. But then the weight of the entire system is increased.

Thus, one object of my invention is to provide a fuel supply system in which the necessity of a surge tank is eliminated.

Another object of my invention is to provide a fuel supply system in which the fuel feed lines and pipes are of normal weight and bulk.

Another object of my invention is to provide a surge system that occupies a minimum of space.

Another object of my invention is to eliminate the time delay required to pressurize or drain a surge tank in a fuel supply system.

Further objects and advantages of my invention will become apparent as the following description proceeds and the features of novelty which characterize my invention will be pointed out with particularity in the claim annexed to and forming a part of this specification.

In the drawing,

Fig. 1 is a diagrammatical representation of the arrangement elements constituting my invention in a pressurized gas type fuel system.

Fig. 2 is a diagrammatical representation of the arrangement of elements constituting my invention in a displacement pump type fuel system.

In Fig. 1, I have shown a fuel tank 1 to which is connected gas line 2 which carries the pressurizing gas for forcing the fuel out of tank 1 through fuel line 3 to the rocket motor 4. Interposed in the fuel line between the fuel tank 1 and the rocket motor 4 is a quick closing solenoid valve 5. At some point of the fuel line 3 between the solenoid valve 5 and the fuel tank 1 is connected a pipe line 6 the other end of which is ported to the fuel tank 1 at such a point that the pressurizing gas entering tank 1 from gas line 2 also enters the pipe line 6. Interposed in pipe line 6 between the fuel line 3 and the fuel tank 1 is a conventional check valve 7 which permits flow in one direction. This check valve is located close to the junction between pipe line 6 and the fuel line 3. The check valve further permits flow only in the direction from the fuel line to the fuel tank.

In operation the pressurizing gas enters through inlet 2 and forces the fuel through fuel line 3 out of the tank 1 and into the rocket motor 4. At some predetermined cut-off point the solenoid valve 5 closes abruptly with the resultant surge of fuel in the line and a large build-up of pressure in the fuel line 3. Prior to that, inasmuch as the pipe line 6 is ported to the gas filled portion of the fuel tank 1, the pressure on this side of the check valve 7 is substantially the same as the pressure on the fuel in the fuel tank 1. Due to pressure drop within the fuel line 3, however, the pressure on the opposite sides of the check valve 7 are different, with the larger pressure being on the gas side of the valve. The valve is of such type that in this normal condition it remains closed and as such no fuel will flow through the pipe line back to the fuel tank. However, upon the sudden closing of the solenoid valve 5 and the resulting increase in surge force the pressure on the fuel side of the check valve increases to such an extent that the check valve is opened and the fuel flows back to the fuel tank thus relieving the pressure in the fuel line and eliminating the possibilities of rupture of the fuel line.

In Fig. 2, the elements are numbered the same as in Fig. 1 except that instead of using pressurized gas for pumping the fuel from tank 1 to rocket motor 4, I use a constant delivery pump 8 interposed in the fuel line 3 between the fuel tank 1 and the rocket motor 4 and upstream of the relief by-pass line. In this form of my invention, I provide a conventional check valve 7' having an adjustable spring which biases the valve gate to a closed position at a constant pressure. The spring force applied should be but slightly greater than that applied by the fuel pump to the fuel so as to keep the by-pass line closed during normal operations. In this arrangement, the fuel tank 1 is provided with a vent 9 for the purpose of keeping the pressure in tank 1 constant while the fuel is being pumped out.

While I have shown a particular embodiment of my invention, it will be understood, of course, that I do not wish to be limited thereto since many modifications may be made, and I, therefore, contemplate by the appended claim to cover any modifications as fall within the true spirit and scope of my invention.

What I claim as new and desire to secure by Letters Patent of the United States is:

A fuel supply system for a rocket comprising a fuel tank, a rocket motor, means including a pressurized gas for pumping the fuel from said fuel tank to the rocket motor, a fuel flow pipe line connecting the fuel tank to the rocket motor, a quick-operating valve in said fuel flow line between the fuel tank and the rocket motor, a surge relief system comprising a by-pass pipe line, one end of said by-pass pipe line branching off the fuel flow pipe line at a point between the quick-operating valve and the fuel tank, the other end of said by-pass pipe line being ported to that part of the fuel tank filled with the pressurizing gas, and a check valve in said by-pass pipe line permitting flow of fluid only in the direction from the fuel flow line to the fuel tank.

References Cited in the file of this patent

UNITED STATES PATENTS

| Number | Name | Date |
|---|---|---|
| 514,394 | Van Everen et al. | Feb. 6, 1894 |
| 2,078,956 | Lysholm | May 4, 1937 |
| 2,345,362 | Smith et al. | Mar. 28, 1944 |
| 2,381,528 | Trich | Aug. 7, 1945 |
| 2,395,113 | Goddard | Feb. 19, 1946 |
| 2,397,834 | Bowman | Apr. 2, 1946 |
| 2,407,852 | Smith | Sept. 17, 1946 |

FOREIGN PATENTS

| Number | Country | Date |
|---|---|---|
| 587,565 | Great Britain | Apr. 30, 1947 |
| 588,083 | Great Britain | May 14, 1947 |
| 588,084 | Great Britain | May 14, 1947 |
| 35,974 | Switzerland | Jan. 20, 1906 |

OTHER REFERENCES

"Rocket Research," by C. P. Lent, third edition, September 1946; Fig. 20.